United States Patent [19]

Libert

[11] Patent Number: 4,887,018
[45] Date of Patent: Dec. 12, 1989

[54] LINE TO LINE TO LINE TO NEUTRAL CONVERTER

[75] Inventor: James T. Libert, Waukesha, Wis.

[73] Assignee: Square D Company, Palatine, Ill.

[21] Appl. No.: 834,685

[22] Filed: Feb. 28, 1986

Related U.S. Application Data

[60] Division of Ser. No. 707,186, Mar. 1, 1985, which is a continuation of Ser. No. 443,001, Nov. 19, 1982, abandoned.

[51] Int. Cl.⁴ .............................................. H02P 1/28
[52] U.S. Cl. ................................. 318/778; 363/149; 328/104
[58] Field of Search .................... 318/809, 729, 778; 307/252 UA, 354; 363/149; 328/104, 134

[56] References Cited

U.S. PATENT DOCUMENTS 3,332,008  7/1967  Mueller et al. .................... 318/809
4,468,603  8/1984  Vander Meer et al. ............ 318/778

Primary Examiner—David Smith, Jr.
Attorney, Agent, or Firm—A. Sidney Johnston; James E. Lowe, Jr.

[57] ABSTRACT

A reduced voltage starter for gradually starting a polyphase motor having an acceleration control circuit for gradually applying power to the motor and detector circuits for detecting various fault conditions for terminating power to the motor. A shorted solid state switch detector senses when one of the semiconductor switches applying power to the motor is shorted to terminate the application of power from the remaining phases. A phase angle control circuit insures a uniform application of power to the motor. A phase rotation detection circuit detects when the three phases are in other than their correct sequence and terminates power in the event of such detection. An underload detection circuit senses when the current drops beneath a preselected reference after the motor has reached its full speed and terminates power in response to such detection. A line-to-line to line-to-neutral convertor produces signals representative of the line-to-neutral voltages which are necessary for other circuit functions.

2 Claims, 13 Drawing Sheets

LINE TO LINE TO LINE TO NEUTRAL CONVERTER

This is a divisional of copending application Ser. No. 707,186, filed Mar. 1, 1985, which is a continuation of co-pending application Ser. No. 443,001 filed Nov. 19, 1982, now abandoned.

BACKGROUND OF THE INVENTION

This invention relates to a reduced voltage motor starter and, more particularly, to a reduced voltage motor starter for three phase induction motors.

In many applications, it is desired to gradually start an induction motor by gradually increasing the power being applied thereto. In addition, in the event of various fault conditions, such as phase reversal, underload, etc., it is desired to terminate power to the motor.

SUMMARY OF THE INVENTION

In accordance with the present invention, a reduced voltage starter with a semiconductor switch for controlling the application of power to a motor is provided with a current ramp acceleration control circuit for gradually starting the motor. The acceleration control circuit is preferably provided with means for providing a relatively low current reference, and means for preselecting a starting time period. In addition, means are provided for controlling the semiconductor switch to cause the motor current to increase gradually from the low current reference to the high current reference during the preselected time period.

In order to achieve many of the control functions in the reduced voltage starter, it is necessary to develop signals representative of each of the three phases of power referenced to neutral rather than from line to line, or phase to phase. Accordingly, a further object of the present invention is to provide a line-to-line to line-to-neutral convertor to develop these line to neutral voltages. In a preferred embodiment, the convertor comprises means for adding a first portion of the phase voltage of each phase to the phase voltage of the next adjacent phase and means for adding a second portion of the next adjacent phase voltage of each phase to the remaining phase voltage in a ratio of one to two with respect to the first mentioned portion to develop a voltage proportional to each of the phase voltages relative to neutral.

It is also necessary to insure that each of the three phases of power are applied to the motor substantially equal magnitudes. Thus, another object of the present invention is to provide in a reduced voltage starter a phase angle control circuit for insuring that the portions of each half wave of power applied to the motor during startup are equal to one another. In a preferred embodiment, this is achieved by a phase angle control circuit having means for generating three sawtooth wave forms having an equal phase relationship with respect to one another, means for generating a reference signal, means for generating three trigger signals respectively in response to said three sawtooth signals exceeding said reference signal and means for switching said three switches to a conductive state to apply power to the motor during each half wave of the power phase associated therewith respectively in response to said three trigger signals.

Yet a further feature of the present invention is the provision of a phase loss detector in a reduced voltage starter. In a preferred embodiment this phase loss detector comprises means associated with each phase for generating a pulse during the period that one of the electrical components of power of that phase has a magnitude less than a preselected level, and means responsive to said pulse exceeding a preselected pulse with for indicating a loss of phase.

A further object of the present invention is the provision of a phase magnitude imbalance detector in a reduced voltage starter. The phase magnitude imbalance detector comprises means for detecting a phase imbalance associated with a phase magnitude imbalance and means responsive to the detecting means for indicating a phase magnitude imbalance. In addition, the extent of imbalance is calculated and the greater the imbalance the faster that action is taken to terminate power to the motor.

Still another objective of the present invention is the provision of means for detecting a phase reversal condition in a reduced voltage starter for a three-phase motor. The phase reversal detector includes means responsive to the first and second phases being concurrently in a common polarity state to generate a first signal, means responsive to the second and third phases being concurrently in a common polarity state, means responsive to the third and first phases being concurrently in a common polarity state for generating a third signal, and means responsive to the third signal occurring during the period between said first and second signals for indicating a phase reversal condition. In the event of detection of the phase reversal condition, power to the motor is terminated.

Yet another objective of the present invention is the provision of an underload detection circuit for a reduced voltage starter in which means are provided for detecting when the motor current decreases below a preselected reference level after the motor has come up to speed. In the event of detection of such a condition, power to the motor is terminated.

BRIEF DESCRIPTION OF THE DRAWING

The foregoing objects, features and advantages will be described in greater detail and further objects features and advantages will be made apparent in the detailed description of the preferred embodiment which is given with reference to the several figures of the drawing, in which:

FIG. 6 is a schematic diagram of a line-to-line to line-to-neutral converter.

DETAILED DESCRIPTION

Figure 1:
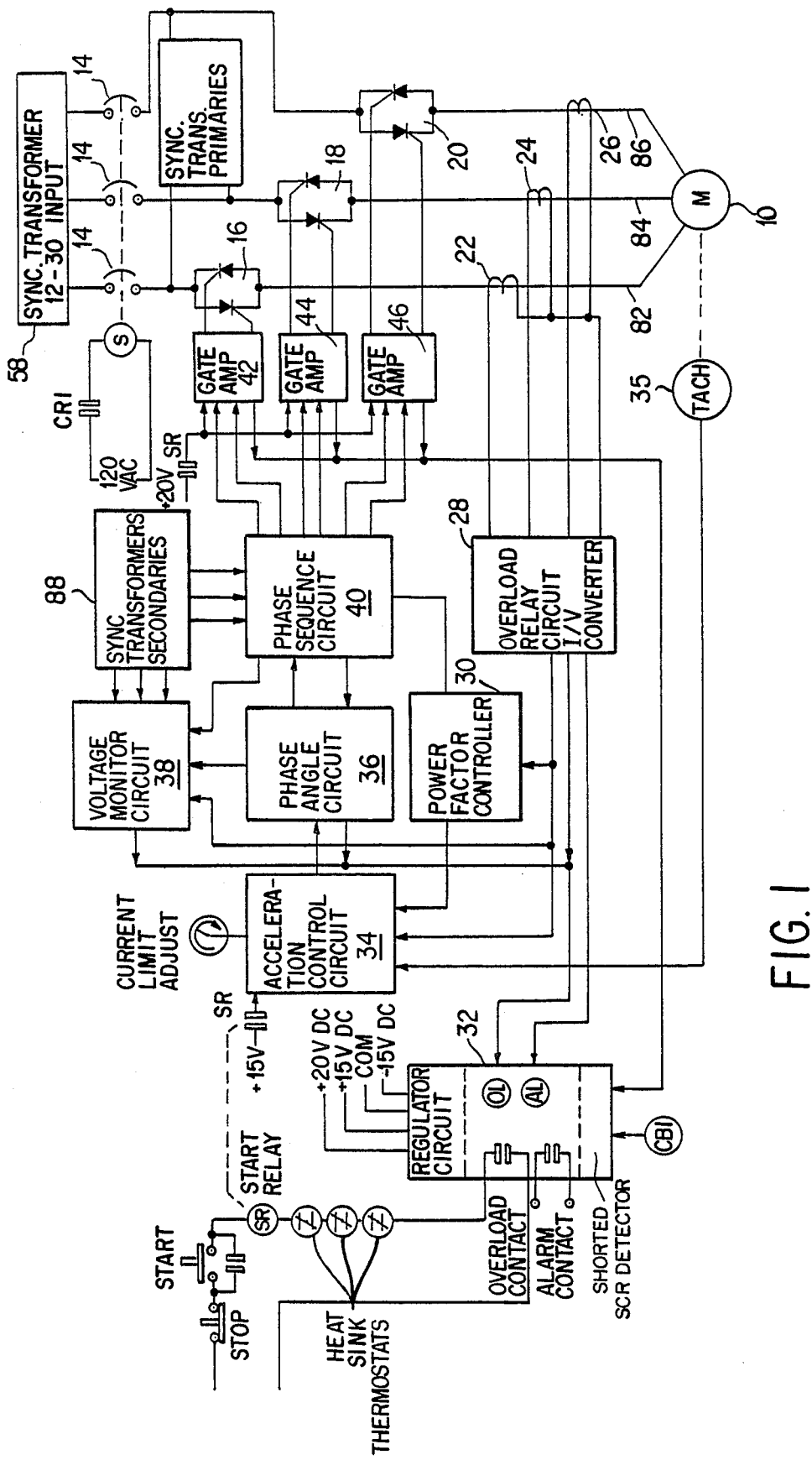
FIG. 1 is an overall block diagram of a reduced voltage starter constructed in accordance with the present invention.

Referring to FIG. 1, the reduced voltage starter circuit of the present invention functions to apply power to a three-phase induction motor 10 in a controlled fashion during starting of the motor and to terminate power in the event of various fault conditions. Three power inputs 82, 84 and 86 are applied to the motor from a three-phase source 58. The power to the motor is controlled by means of three semiconductor switch circuits 16, 18 and 20 respectively coupled with power leads 82, 84 and 86. The three semiconductor switching circuits, in turn, are controlled by three gate amplifier circuits 42, 44, and 46, respectively. The power to the motor is monitored by means of three current transformers 22, 24, and 26. The gate amplifier circuits, in turn are, controlled by a phase sequence control circuit 40.

The phase sequence control circuit receives inputs from three sync transformer secondaries 88, primaries of which are delta connected with the three power leads 82, 84 and 86. The phase angle control circuit 36 determines the phase angle at which the semiconductor switches are turned on during each half wave. The phase sequence control circuit receives signals from the phase angle control circuit 36 and determines the order in which the three semiconductor switches apply power to the motor. A voltage monitor control circuit 38 functions to monitor the voltage applied to the motor for fault conditions. The acceleration control circuit 34, on the other hand, functions to control the phase angle control circuit 36 during starting of the motor 10. After the motor has come up-to-speed, the power factor control circuit 30 functions to improve the power factor of the power applied to motor 10 by controlling the phase angle control circuit.

Details of some of the other circuitry of FIG. 1 and further background information may be obtained by reference to the following applications assigned to the assignee of the present application and filed contemporaneously herewith, identified as follows:

| Docket No. | Inventors | Title |
|---|---|---|
| IC-614 | Jeffrey Reichard Julian Kampf | Reduced Voltage Starter with Voltage Ramp Control |
| IC-615 | Jeffrey Reichard | Reduced Voltage Starter with Power Factor Control Circuit |
| IC-616 | Earl Curran | Reduced Voltage Starter with Linear Timed Acceleration |
| IC-617 | Richard Graefe | Reduced Voltage Starter with Overload Protection |

Figure 2A:
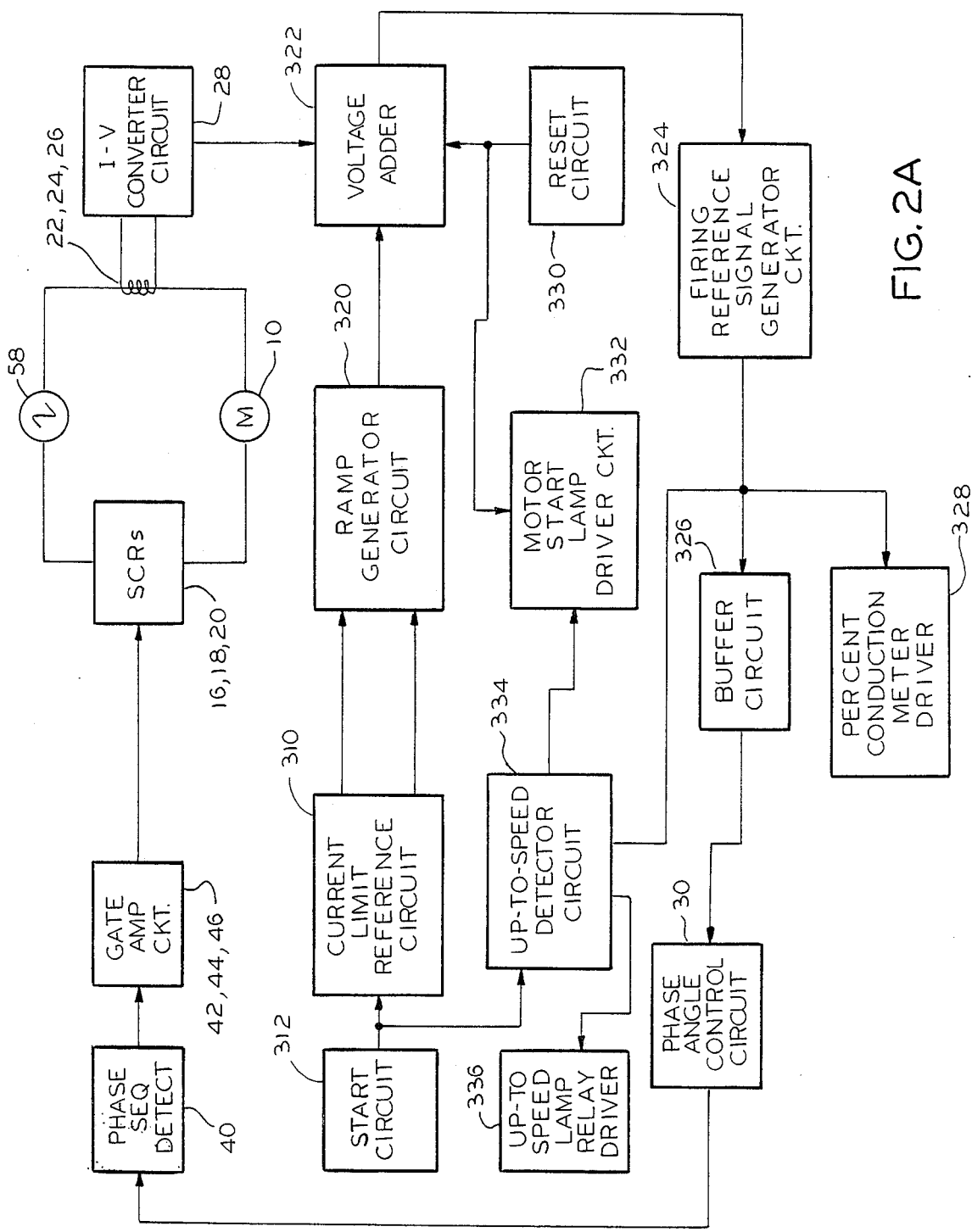
FIG. 2A is another block diagram illustrating the current ramp acceleration control feature of the present invention.

FIG. 2A is a functional block diagram of a current-ramp start circuit that forms one version of the accelerator control circuit 34 of FIG. 1. Three-phase source 58 supplies power to a motor 10. Power to motor 10 is controlled by SCR's 16, 18, and 20 and current flowing to motor 10 is detected by current transformers 22, 24 and 26. Current-voltage converter circuit 28 generates a voltage that provides a measure of the current detected by current transformers 22, 24, and 26. The output of current-voltage converter circuit 28 is taken to voltage adder 322.

Current limit reference circuit 310 is enabled by a signal at start terminal 312 to provide two output signals that are coupled to control ramp generator circuit 320. The output of ramp generator circuit 320 is a voltage ramp that is also coupled to an input of voltage adder 322. Reset circuit 320 generates a signal that resets voltage adder 322. The output of voltage adder 322 is coupled to an input of firing reference signal generator circuit 324. Generator circuit 324 generates an output signal that is connected to a buffer circuit 326, a percent conduction meter driver 328, and an up-to-speed detector circuit 334. The output signal of buffer circuit 326 is applied to an input of phase angle control circuit 36 and to phase sequence circuit 40, the phase sequence circuit 40 controls gate amplifiers 42, 44, and 46 to operate SCR's 16, 18, and 20 in response to this output signal. Percent conduction meter driver 328 produces a signal to operate a panel meter indicating the time percent of conduction of SCR's 16, 18, and 20. The output of up-to-speed detector circuit 334 is also coupled to an input of up-to-speed lamp relay driver 336 which operates a panel lamp to indicate that the motor is up to speed. Up-to-speed detector circuit 334 is enabled by an input from start terminal 312. A second output from up-to-speed detector circuit 334 is taken to motor start lamp driver circuit 332 which is reset by a pulse from reset circuit 330 to provide a lighted indication that motor 10 is starting.

Figure 2B:
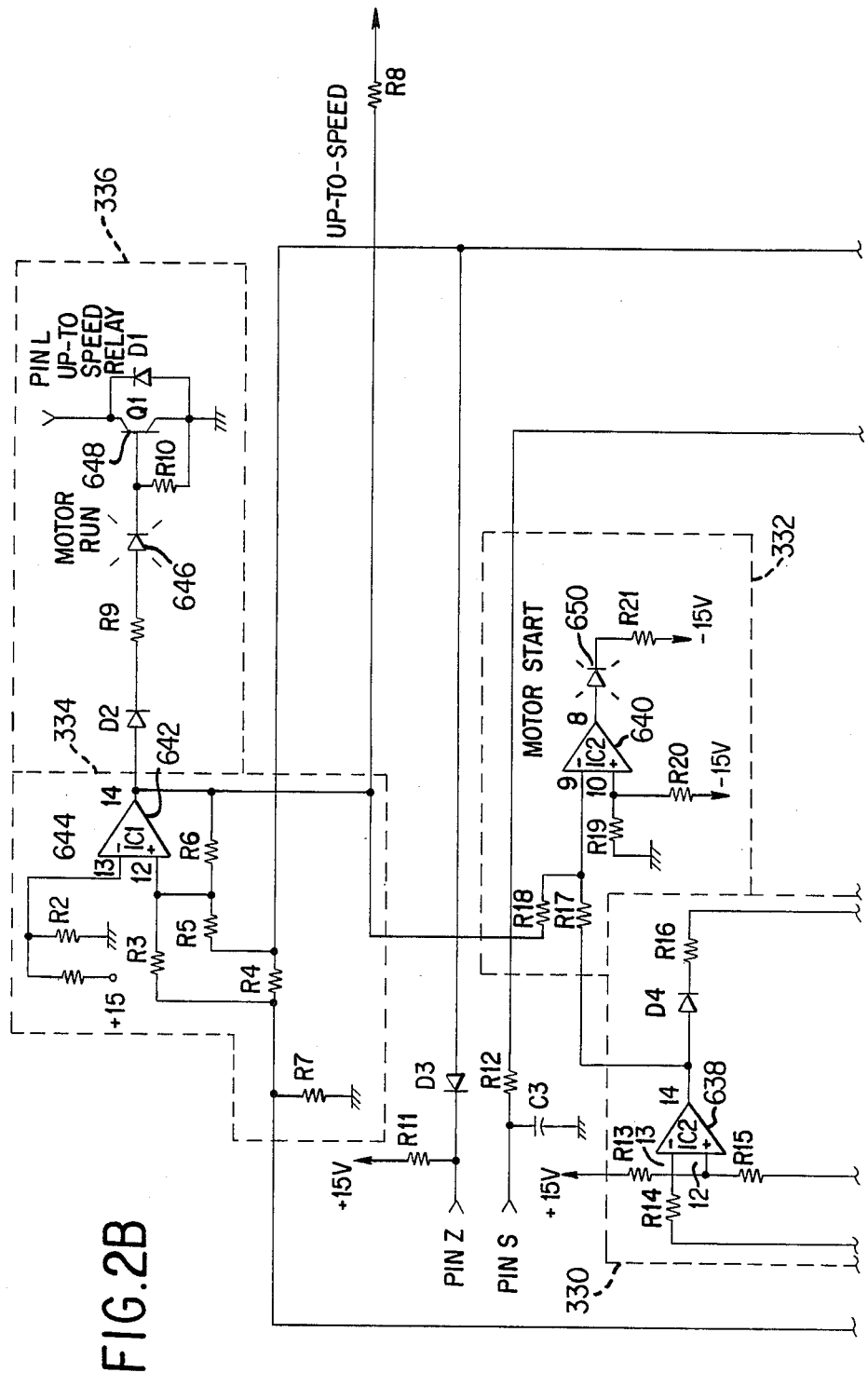
FIG. 2B is a circuit schematic corresponding to the functional block diagram of FIG. 2A.
Figures 1, 2B:
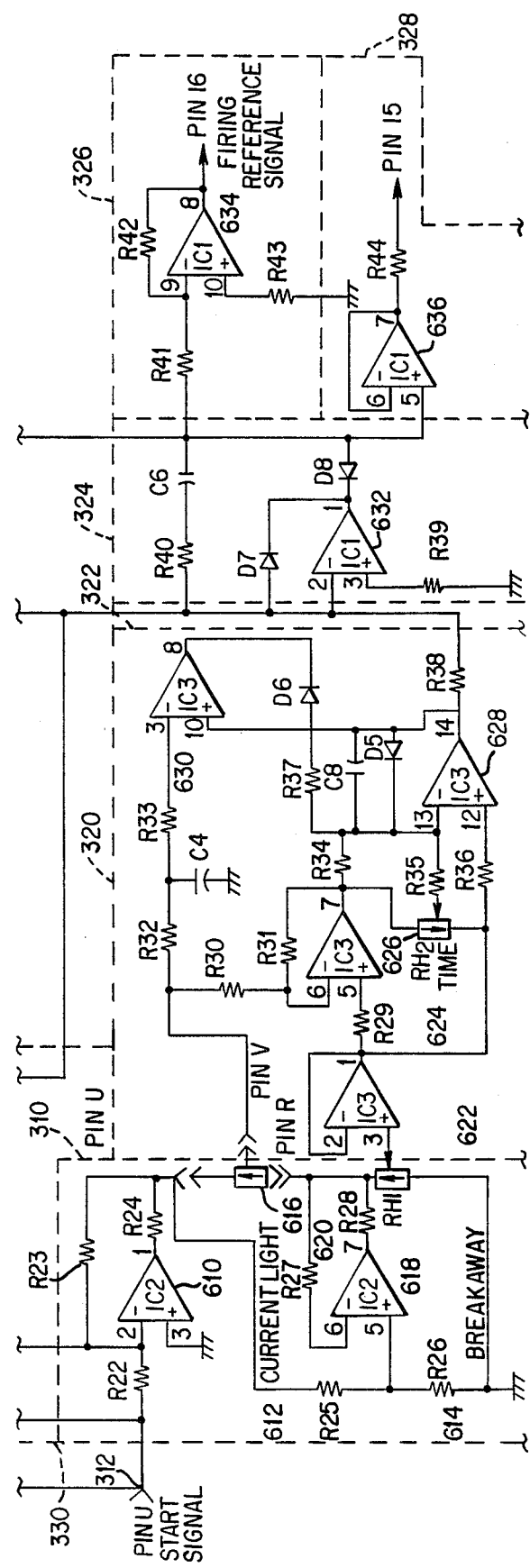

FIG. 2B is a detailed circuit schematic of preferred circuitry for implementation of the functional blocks of FIG. 2A. Start terminal 312 is connected to a common terminal during standby conditions. At the beginning of a start sequence a voltage is applied at start terminal 312 and coupled to current limit reference circuit 310. There it supplies an input to an inverting amplifier 610. The output of amplifier 610 is connected to a series combination of resistors 612 and 614 which form a voltage divider and also to a pair of series connected potentiometers 616 and 618. The voltage divider formed by resistors 612 and 614 is connected to divide a voltage that is equivalent to a current limit characteristic of the motor. This current limit is typically 450 percent of full-load current. The divided voltage at the junction between resistors 612 and 614 is set at a level corresponding to a breakaway current of the motor 10. The breakaway current is typically 150 percent of the full-load current of the motor. Operational amplifier 620 functions as a buffer between potentiometers 616 and 618 so that the top of potentiometer 616 is set at the maximum breakaway current signal level. Potentiometer 616 is adjustable to provide a controlled upper limit on motor current and potentiometer 618 is adjustable to provide a controlled upper limit on the breakaway current for motor 10.

The voltage selected at potentiometers 616 and 618 is coupled to an input of ramp generator 320. Potentiometer 618 is connected to a buffer 622, the output of which is taken to an inverting amplifier 624 and to a potentiometer 626. The output of potentiometer 626 is taken to an integrator 628 which generates a voltage ramp between the voltage set by potentiometer 618 and that set by potentiometer 616 during a time period determined by the setting of potentiometer 626. An operational amplifier 630 is connected at the output of integrator 628 to stop ramp generations when the voltage ramp reaches its upper limit. It also resets integrator 628 when the motor is stopped. The output of integrator 628 is coupled to an input of voltage adder 322. The output of voltage adder 322 is coupled to an input of firing reference signal generator 324. There an integrator 632 responds to the voltage at voltage adder 322 to generate an output signal that is coupled to a buffer 326 which contains an inverting amplifier 634. The output of integrator 632 is also connected to an input of a percent conduction meter driver 328 which contains a buffer amplifier 636 for driving a panel meter indicating the percent conduction of SCR's 16, 18, and 20.

Referring again to start terminal 312, an inverting amplifier 638 of a reset circuit 330 receives a signal from terminal 312 and applies it to voltage adder 322 to reset integrator 632 when the motor is turned off. The output of inverter 638 is also taken as an input to start lamp driver 322 where it is applied as one input to an amplifier 640. A second input to operational amplifier 640 is generated by applying the voltage at terminal 312 to up-to-speed circuit 334 to enable up-to-speed detector 334.

That signal is coupled to one input of a comparitor 642. A second input signal to comparitor 642 is derived from voltage divider 644. A third input signal to comparitor 642 is the ramp voltage at the output of integrator 632. The output of comparitor 642 is connected to an input of up-to-speed lamp relay driver 636 where it is applied through a LED 646 to a transistor 648 to drive a relay. The output of comparitor 642 is also coupled to a second input of amplifier 640, the output of which drives LED 650 to provide a lighted indication that the motor is starting. The output of comparitor 642 is an up-to-speed signal that is available for use elsewhere in the starter circuit.

Figure 3A:
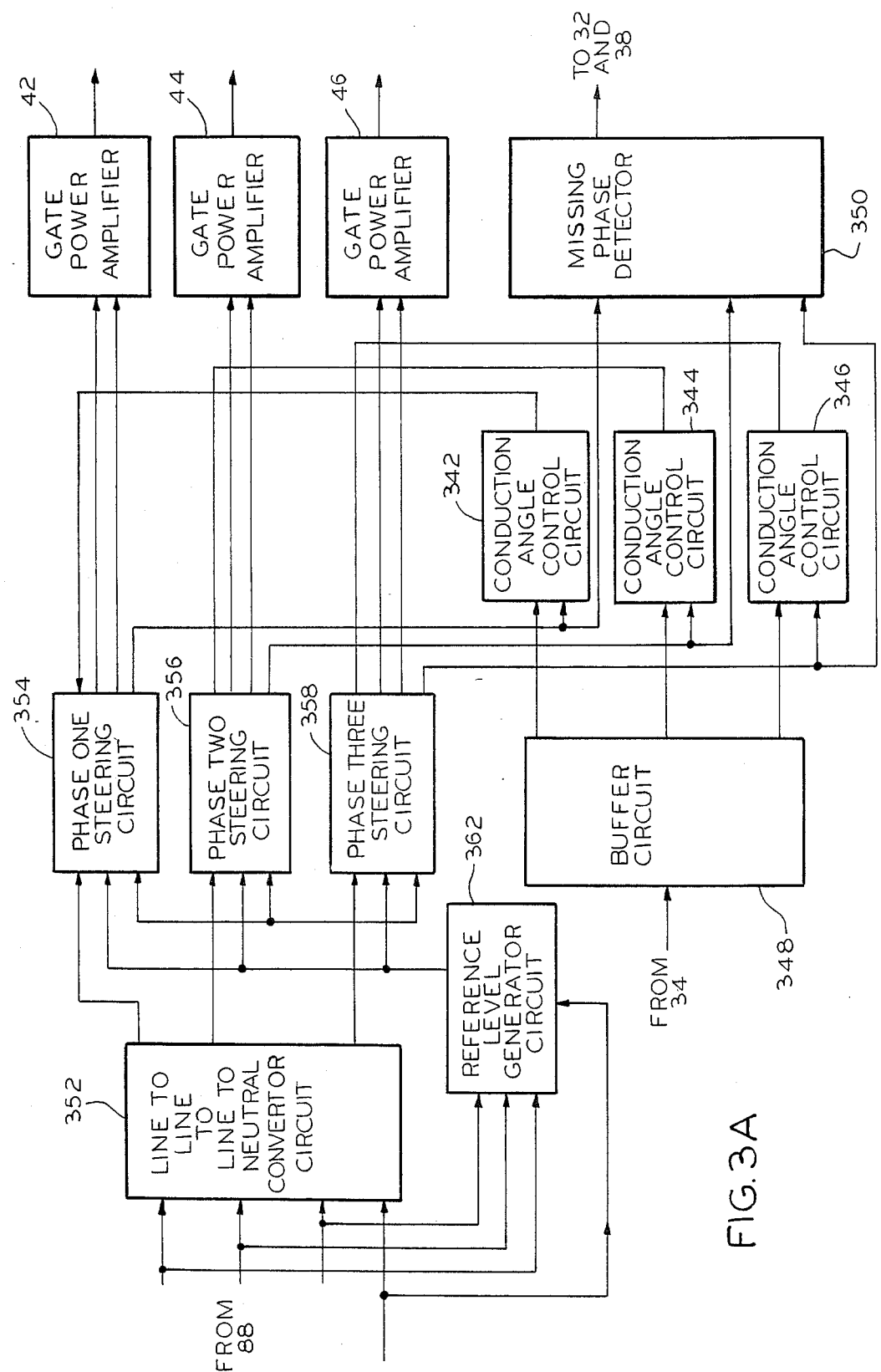
FIG. 3A is another functional block diagram illustrating the phase angle and phase sequence control blocks of FIG. 1.

Referring to FIG. 3A, the circuitry for phase angle circuit 36 and phase sequence circuit 40 of FIG. 1 will be described. Phase converter 352 receives voltages from synchronizing transformers secondaries 88 of FIG. 1. Phase convertor 352 receives line-to-line voltages from transformers 88 and converts them to line-to-neutral or phase voltages that correspond to the equivalent phase voltages from secondaries 88. Inputs from transformer secondaries 88 are also taken to reference level generator circuit 362 which establishes two reference levels that are coupled to phase steering circuits 354, 356, and 358.

Figure 2:
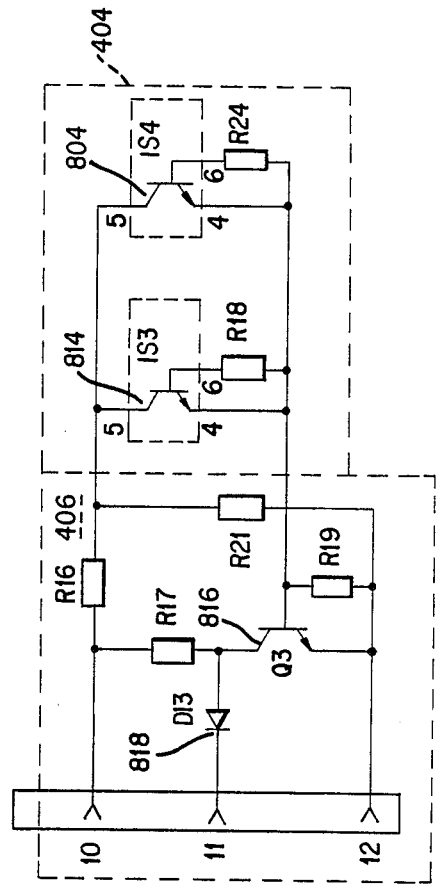

Buffer circuit 348 receives an input signal from acceleration controller circuit 34 which provides a reference angle for the firing of SCR's 16, 18, and 20 of FIG. 2. Output signals of buffer circuit 348, one for each phase, are respectively coupled to conduction angle control circuits 342, 344, and 346. Outputs from these circuits are coupled to steering circuits 354, 356, and 358, respectively, to serve phases one, two and three. Additional output signals are coupled from steering circuits 354, 356, and 358 to missing phase detector 350. Missing phase detection generates a signal preventing the motor from starting if one phase of the electrical energy is missing.

Figure 3B:
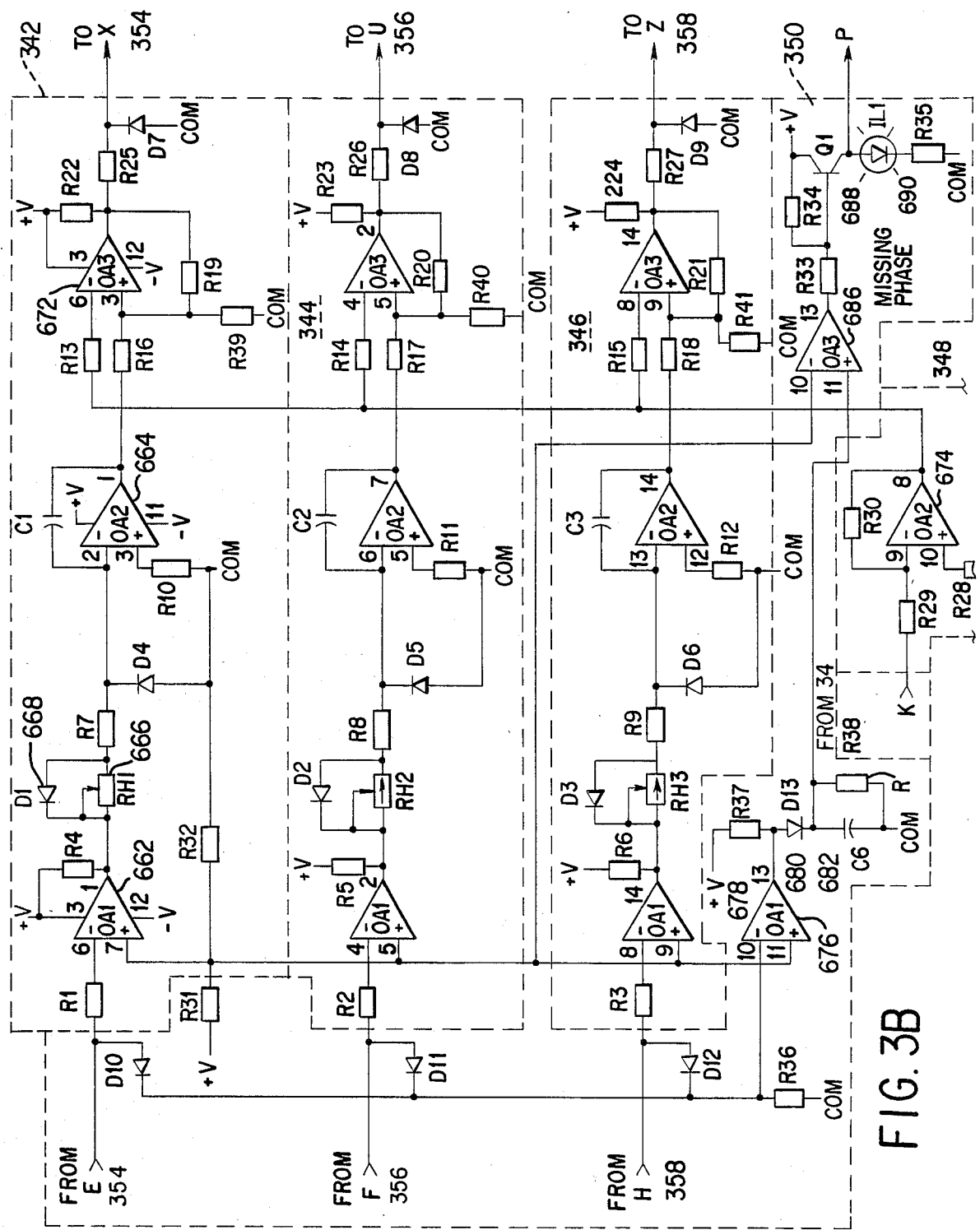
FIG. 3B is a schematic of preferred circuitry for implementation of some of the functional blocks of 3A.
Figure 3C:
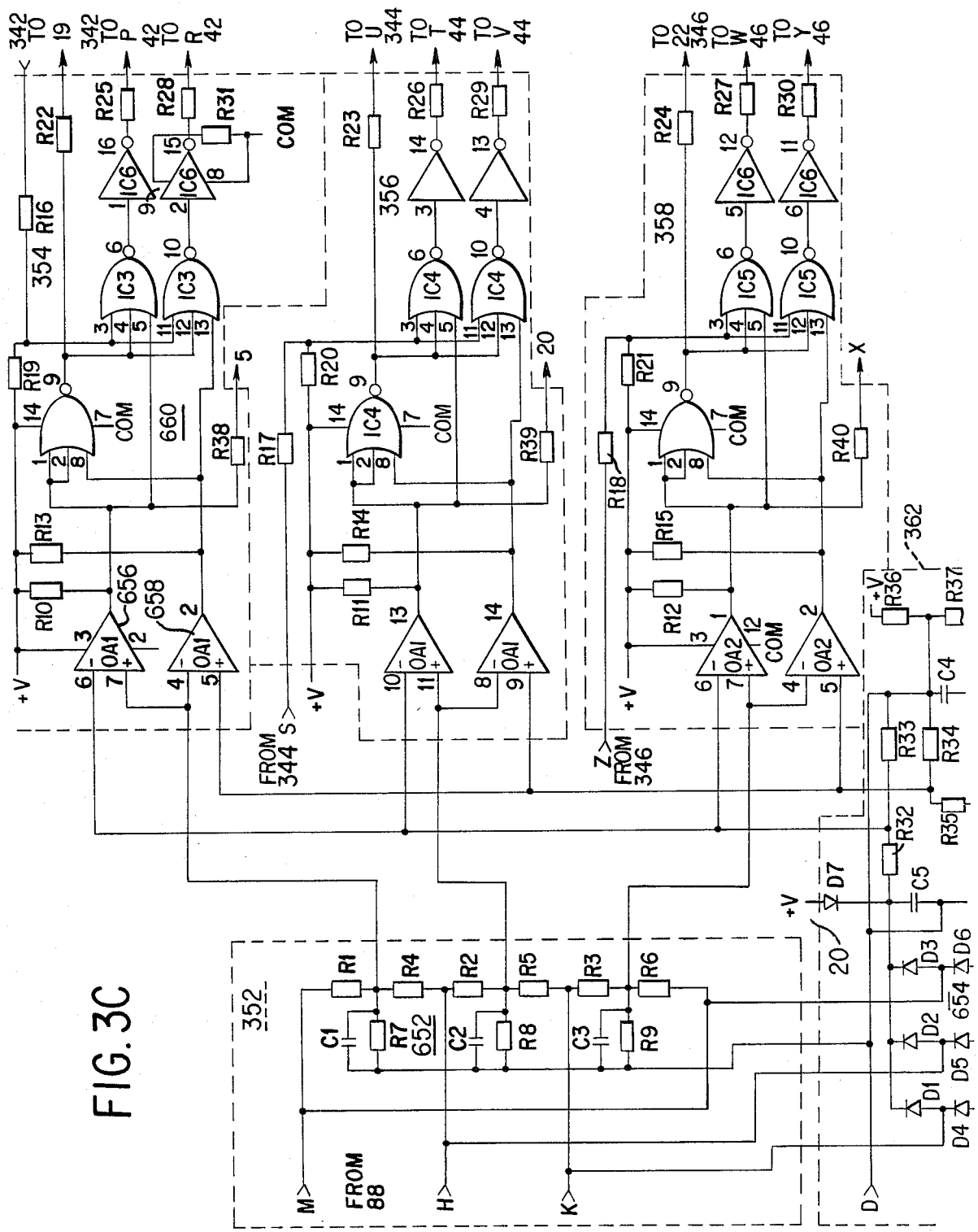
FIG. 3C is a schematic of circuitry preferred for implementation of other functional blocks of FIG. 3A.

Referring to FIGS. 3B and 3C, a three-phase input from secondaries 88 of FIG. 1 is applied to phase converter 352. There each phase is applied to one portion of a resistive network 652 which adds the voltage of one phase to half that of another phase to effect a delta-wye conversion of the voltages. Outputs corresponding to the three phase voltages are coupled to three phase steering circuits 354, 356 and 358. Since these are identical in structure, only phase steering circuit 354 will be described in detail. A second input to each of circuits 354, 356 and 358 is developed by reference level generator circuit 362 which receives the three-phase input from transformers 88 and applies them to a three-phase bridge rectifier 654. The DC output voltage from bridge rectifier 54 establishes a reference voltage with respect to a neutral line from secondaries 88 and generates two DC voltages that are taken as inputs to steering circuits 354, 356, and 358, respectively, to serve as reference voltages in those circuits. Reference voltages from reference level generator circuit 362 are coupled to phase one steering circuit 354 to two comparitors 656 and 658, each of which also receives sinusoidal input signals from phase convertor 352. The outputs of comparitors 656 and 658 are taken to logical network 660 which also receives as an input a signal from conduction angle controller 342.

Logical network 660 generates three outputs. One is coupled to conduction angle controller 342. The other two are coupled to gate amplifier 42 where one is a trigger signal for one of the SCR's 16 and the other is a trigger signal for the other SCR 16 so that conduction in both polarity directions is controlled. Conduction angle controllers 344 and 346 are identical in construction and perform the same functions for phases two and three. Each of the pulses taken to conduction angle controllers 342, 344, and 346 exists only in a predetermined narrow angle near the zero crossing of the sinewave of the appropriate phase.

Referring now to FIG. 3B, three identical conduction angle control circuits 342, 344, and 346 are provided. For this reason only control circuit 342 will be described in detail. Control circuit 342 receives a reset pulse from phase one steering circuit 354. The signal from steering circuit 354 is applied to an invertor 662. An integrator 664 is connected to invertor 662 through a parallel combination of a potentiometer 666 and a diode 668. When the integrator 664 is being reset, conduction is through diode 668, and potentiometer 666 is bypassed. Potentiometer 666 is adjustable to control the ramp rate of integrator 664 when it is integrating its input signal. Potentiometers corresponding to potentiometer 666 in controllers 344 and 346 are adjusted to achieve identical slopes of the integrators corresponding to integrator 664. The ramp output of integrator 664 is coupled to one input of a comparitor 672. A second input to comparitor 672 is derived from a DC signal representing the firing angle of the associated semiconductor, received from acceleration module 34. This is connected to buffer circuit 38. There a buffer amplifier 674 provides isolation for the signals corresponding to comparitors 672 of controllers 342, 344, and 346. The output of comparitor 672 is taken to steering circuit 354 to provide a trigger signal for that circuit. Reset pulses from steering circuits 354, 356, and 358 are combined logically and coupled to an input missing-phase detector 350 which is connected to one input of operational amplifier 676 which is connected as a logical invertor. The output of operational amplifier 676 is connected to the junction between resistor 678 and diode 680 which constitutes a charging path for capacitor 682. In normal operation, when all three phases are present, the input to operational amplifier 676 will comprise six pulses per cycle. Each of these pulses interrupts the conduction of diode 680, stopping the charging of capacitor 682. However, these pulses are short enough in time that capacitor 682 normally stays charged continuously. Loss of any one of the three phases causes a constant output from operational amplifier 676 which stops conduction of diode 680 and allows capacitor 682 to discharge through resistor 684. This produces a signal that is coupled to comparator 686 to generate a missing-phase signal at transistor 688. Conduction of transistor 688 causes loss of a phase light LED 690 to provide a panel indication of the loss of phase. The signal indicating phase loss is also available for use in other parts of the circuit.

Figure 4A:
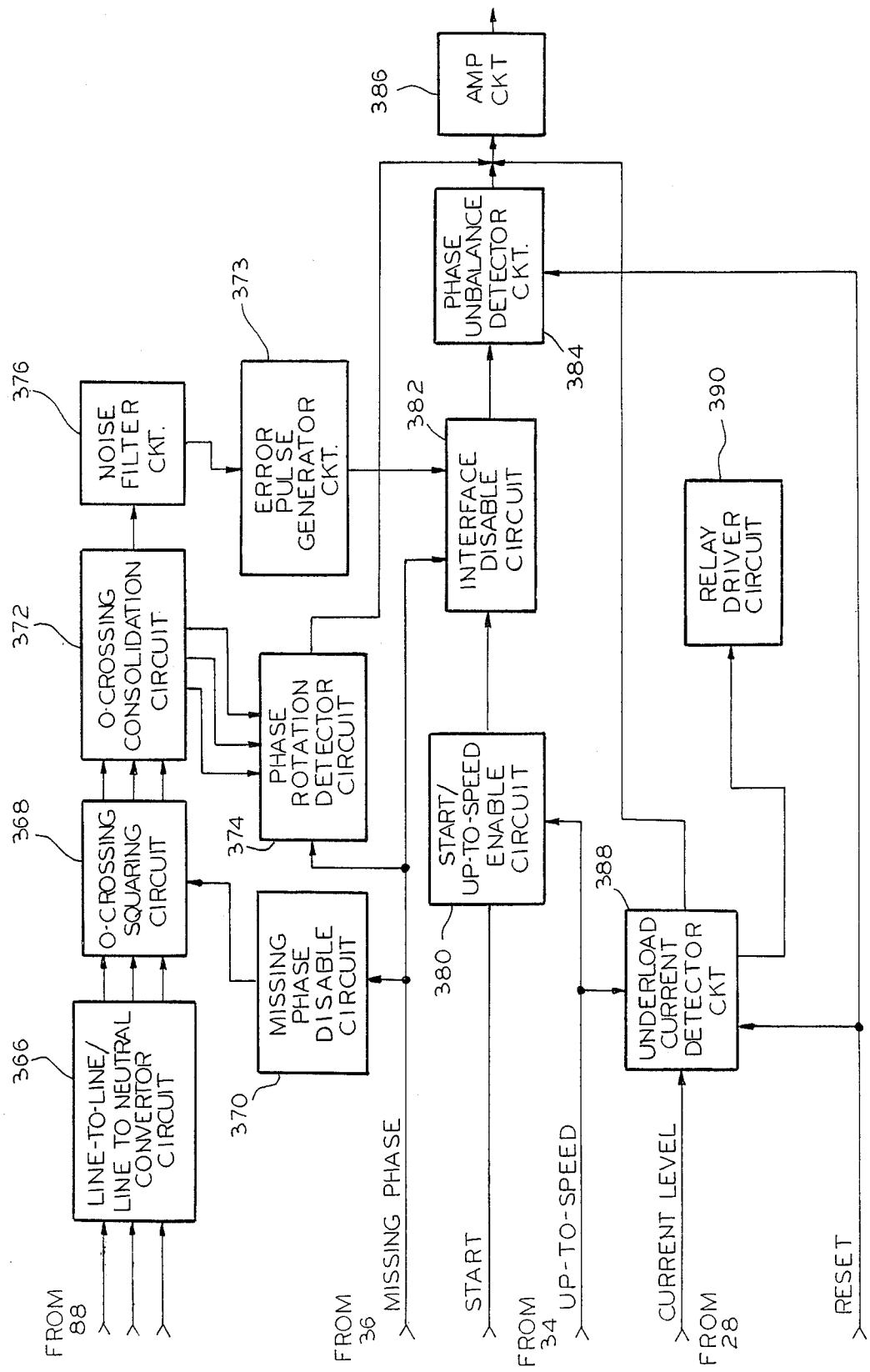
FIG. 4A is a functional block diagram illustrating the line-to-line/line-neutral-convertor circuit, the phase rotation detector circuit, the missing phase detection circuit, the under load current detector circuit and related features of the present invention.

Referring to In FIG. 4A, the signals from transformers 88 are coupled to inputs of converter circuit 366. Comparator 366 establishes voltages that are equivalent to the line-to-neutral or are equivalent of the delta inputs from source 58. The converted output signals from converter 366 are coupled to zero-crossing and squaring circuit 368. The signal from phase angle circuit 36 of FIG. 1 is taken to missing phase disable circuit 370 to supply a signal that will disable circuit 368 if a phase is missing during standby. If all phases are present, circuit 368 produces three square waves that are 120 electrical degrees apart. If the voltages from transformers 88 are balanced, zero crossings of the square waves produced in circuit 368 will be at the same relative locations as zero crossings of the sinusoidal output voltages of converter circuit 366.

Zero-crossing consolidation circuit 372 produces a logical combination of the square waves from zero-crossing squaring circuit 368. This is coupled to a phase rotation detector circuit 374 to verify that the connection of the leads to motor 10 are in a proper phase sequence. Circuit 374 is enabled by a signal from phase angle circuit 36 of FIG. 1. A different logical combination of the square waves from circuit 368 is effected in zero-crossing consolidation circuit 372 to produce a 180 Hertz signal that is filtered in noise filter 376 and applied to error pulse generator 378. If the line voltages from transformers 88 are balanced the square wave output from noise filter 376 is a symmetrical square wave at a frequency of 180 Hertz. A phase imbalance will cause varying separations from pulse to pulse. Such separations are detected in error pulse generator 378. The output of error pulse generator 378 is coupled to interface disable circuit 382 which functions to ignore apparent phase imbalance during start up and in case of detection of a missing phase. Interface disable circuit is thus connected to receive a signal from phase angle circuit 36 to indicate that a phase is missing. It receives a signal from start and up-to-speed enable circuit 380 to disable interface disable circuit 382 when the motor is starting. Start and up-to-speed enable circuit(receives a signal indicating that the start sequence has begun and receives another signal from acceleration control unit 34 which indicates that the motor is up to speed.

The up-to-speed signal from acceleration control unit 34 and a current level signal from current-voltage convertor 28 are coupled to underload current detector 388. Detector 388 provides an output signal indicating that the motor load has decreased below a preset minimum. The output of underload current detector 388 is taken to relay driver circuit 390 for energizing a relay to operate an alarm or other warning device to indicate an underload condition. The output of underload current detector is also coupled to an input of amplifier 386 together with the outputs of phase unbalance detector 384 and phase rotation detector circuit 374. Either a phase imbalance indication imbalance detector 384 or an underload as detected by underload current detector 388 requires a manual reset to restore the equipment to normal operation. Amplifier 386 produces no output unless it has received an input indicating that the phase sequence is incorrect, that one phase has been lost, or that there is a condition of motor underload.

Figure 4B:
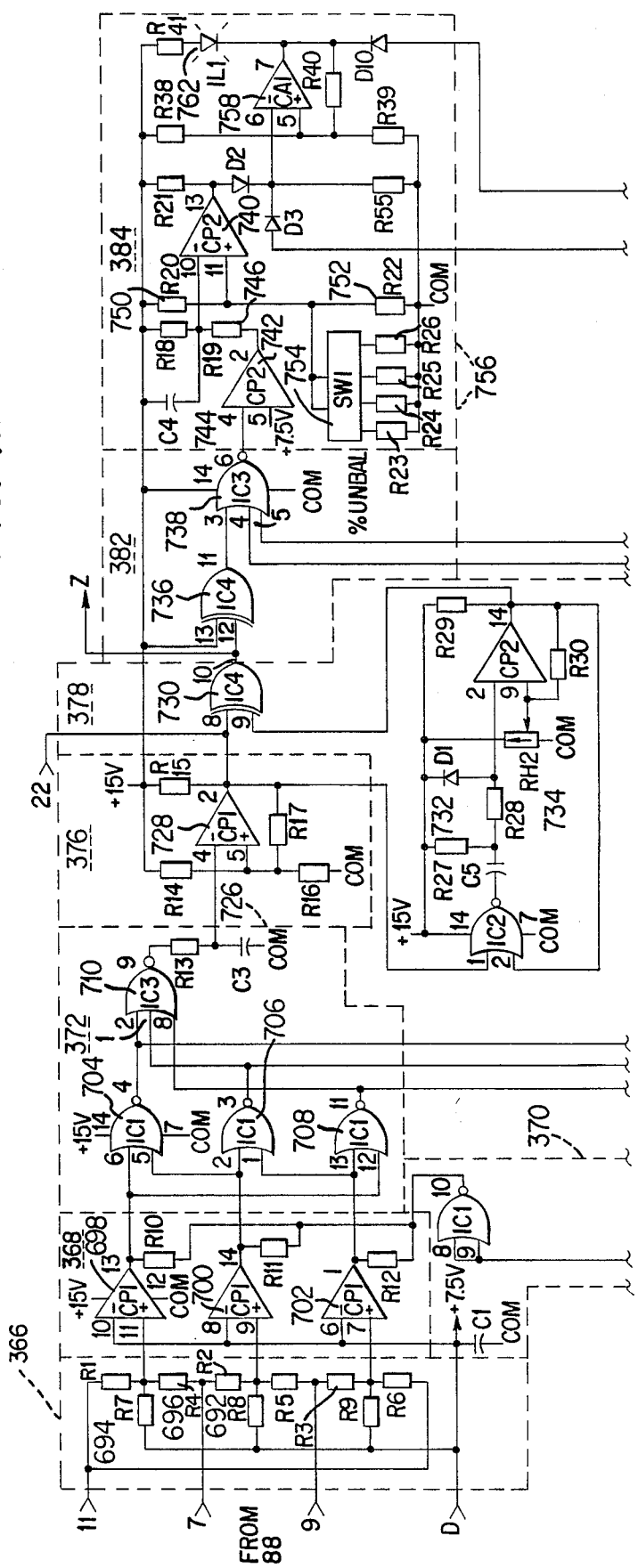
FIG. 4B is a circuit schematic of circuitry preferred for implementation of the functional blocks of FIG. 4A.
Figures 1, 4B:
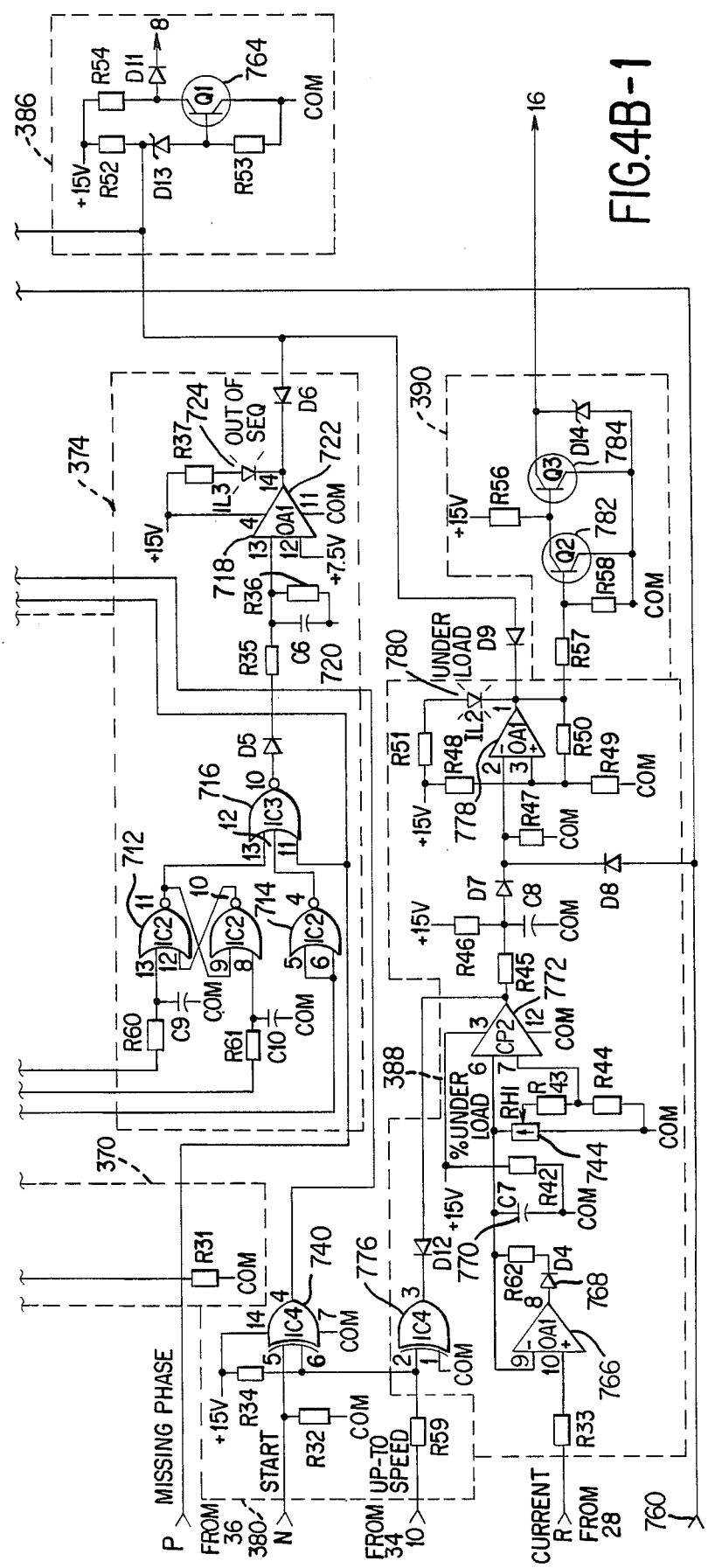

Referring to FIG. 4B, the three-phase voltages from transformers secondaries 88 are coupled to convertor circuit 366 where they are applied to a network 692 that produces a three-phase voltage which is the wye equivalent of the delta inputs from transformer secondaries 88. The sum of one line of a delta-connected voltage source plus half of the voltage of another line of the delta connected source is equal to the line-to-neutral equivalent voltage of the same source. This summation is effected in network 692 by resistor 694 which is half the resistance of resistor 696 and the same pattern is repeated through the corresponding elements of network 692.

Voltage output signals from network 692 are coupled to zero-crossing squaring circuit 368 in which three comparators 698, 700 and 702 amplify and clip the sine-waves to produce square waves. The output of zero-crossing squaring circuit 368 is coupled to zero-crossing consolidation circuit 372 and applied to pairs of NOR gates 704, 706 and 708. At the output of each NOR gate is formed a rectangular pulse of sixty electrical degrees that is spaced 120 electrical degrees from the pulses on each of the other two NOR gates. These pulses are combined in a NOR gate 710 to produce a square wave. This square wave is coupled to the phase rotation detector 374 which includes flip-flop 712. The pulses are also combined in a flip-flop 712 where one pulse sets flip-flop 712 and a second pulse resets flip-flop 712. The output of flip-flop 712 is compared with an inverted pulse from the third phase which is inverted in invertor 714. The comparison is made in NOR gate 716 which produces an output only when there is a phase reversal. The output of NOR gates 716 is coupled to error pulse detector 718 with capacitor 720 accumulating pulses so that it takes several pulses to operate amplifier 722 and light LED 724. The output of amplifier 722 also provides an out-of-phase induction signal that is coupled to amplifier 386.

The output of NOR gate 710 is a square wave at a frequency of 180 Hz. which is symmetrical if the input phase voltages are balanced. The output of NOR gate 710 is coupled to noise filter 376. There a capacitor 726 removes noise components from the signal. The filtered signal is coupled to comparator 728 to produce a shaped square wave output signal. The output of noise filter 376 is coupled to error pulse generator 378 as one input to an exclusive NOR gate 730. The output of noise filter 376 is also coupled to a one-shot 732 of the error pulse generator. The width of the square wave generated by one shot 732 is adjustable by the setting of potentiometer 734. The output of one-shot 732 is taken to the exclusive NOR gate 730 where it is compared with the output of noise filter 376. An output corresponding to the difference between the output of noise filter 376 and the output of one-shot 732 is taken to interface disable circuit 382 where it is applied through an exclusive NOR gate 736, connected as an invertor, and then to a NOR gate 738.

Two inputs are combined in start and up-to-speed enable circuit 380. A start signal and an up-to-speed signal from acceleration control circuit 34 are taken as inputs to exclusive NOR gate 740. The output of exclusive NOR gate 740 is taken as an input to NOR gate 738 of interface disable circuit 382. A third input to NOR gate 738 is obtained as a missing phase signal from phase angle circuit 36. The output of interface disable circuit 382 is coupled to phase imbalance detector 384 where it is applied to a comparator 742. Comparator 742 will receive a certain number of pulses in normal operation resulting from normal and unavoidable variations in characteristics of line voltage. These pulses will cause capacitor 74 to charge to a characteristic level through resistor 746. The level of that voltage is compared in comparator 748 with the level set by a voltage divider formed from resistor 750 and the parallel combination of resistors 752 and a resistive combination selected by BCD switch 754 and resistors 756. BCD switch 754 allows the operator to select a resistance that corresponds to an allowable amount of phase imbalance. The fact of the charge and discharge of capacitor 744 creates an inverse-trip-time effect in that an imbalance exceeding the setting of BCD switch 754 by a small amount for a long time can have the same effect as an indication exceeding the setting by a large amount for a short time.

The output of comparator 748 is taken to comparator 758 which will hold the output until it is reset by a signal at reset terminal 760. This is normally initiated manually from a panel. When comparator 758 is in a set position as a result of an output from comparator 748 indicating an imbalance condition, LED 762 is lighted to give a visible indication and an output is coupled to amplifier 386 where it causes transistor 764 to turn off.

Underload detector 388 receives an input corresponding to motor current from current-voltage convertor 28 and an up-to-speed indication from acceleration control circuit 34. The current indication is applied to an operational amplifier 766 which together with diode 768 is connected to form an ideal diode circuit. The resulting ideal diode is connected to capacitor 770 to form a peak detector. The detected peak is connected to where it is compared with a voltage selected by potentiometer 774. The setting of potentiometer 774 allows the operator to select the desired percentage underload. The output of comparator 772 is combined with an up-to-speed signal obtained from acceleration control circuit 34 and buffered in an exclusive NOR gate 776. The combined signal is combined with a reset signal from reset terminal 760 if one is present and the combined signal is coupled to comparator 778. After the motor is up to speed an up-to-speed signal is generated and an undercurrent signal causes comparator 778 to toggle lighting LED 780. The output of underload current detector 388 is taken as another input to amplifier 386. In addition to lighting LED 780, the output of comparator 778 is taken to relay driver 390 where it drives cascaded transistors 782 and 784 to provide an output at a power level sufficient to drive a relay as desired.

Figure 5A:
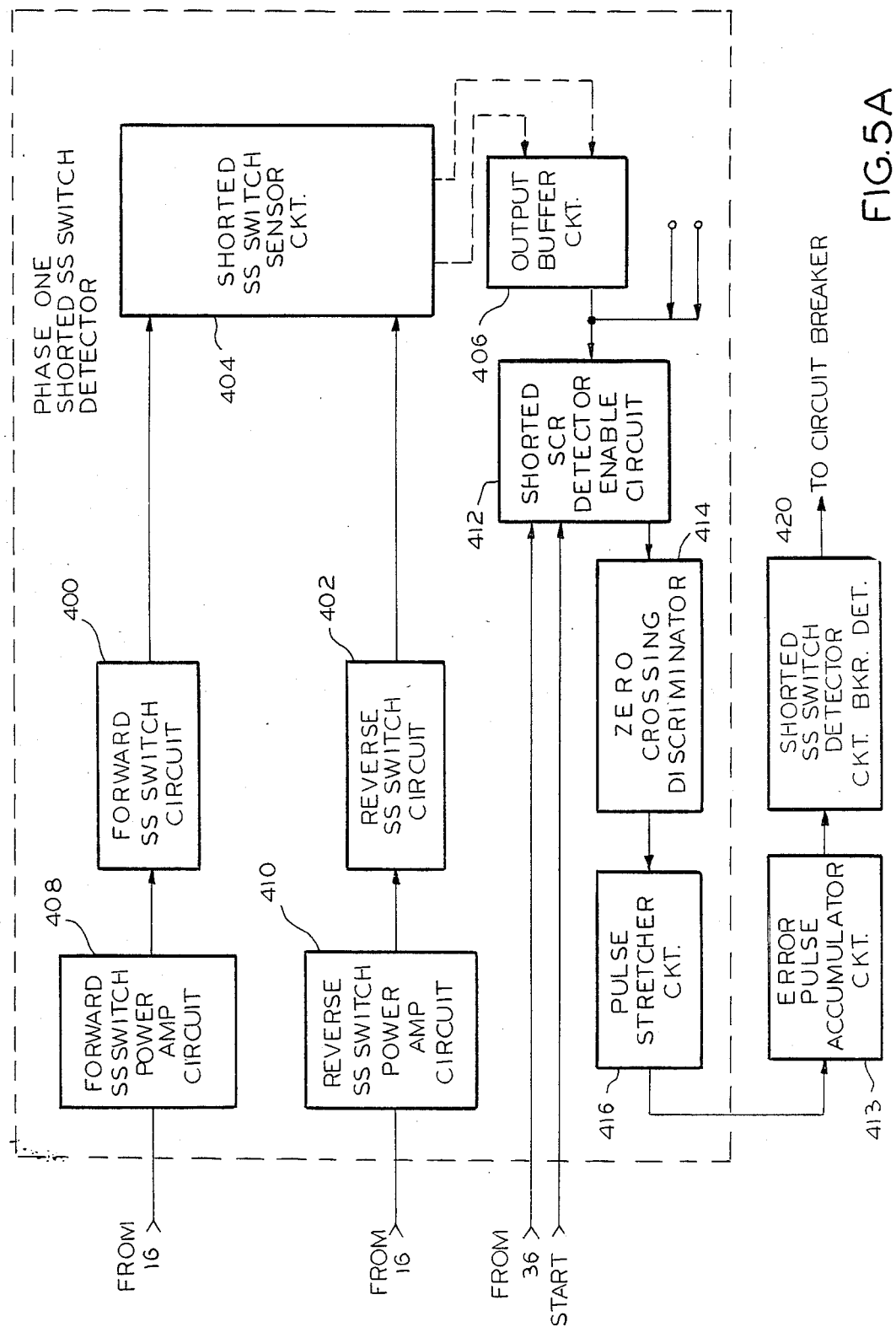
FIG. 5A is another functional block diagram illustrating the shorted solid state switch sensor feature of the present invention.

FIG. 5A is a functional block diagram of a circuit for detecting a shorted semiconductor switch. It should be noted that portions of FIG. 5A are repeated, one for each of the SCR's 16, 18, and 20. For simplicity, only the portion for SCR 16 is shown in FIG. 5A. A signal from SCR 16 is coupled to semiconductor switch power amplifier switch circuit 408 from which it is coupled to SCR switch circuit 400. A shorted SCR generates a signal that is taken to a detected and shorted switch center for all four SCR's. Similarly, a signal from SCR 16 is received and applied to reverse power amplifier circuit 410. The output of amplifier 410 is coupled through reverse switch circuit 402 to shorted semiconductor switch center 404. Detection of a short in either SCR of switching circuit 16 causes generation of a signal that is coupled optically to output buffer 406. The output of output buffer 406, together with outputs of corresponding buffers carrying signals from SCR's 18 and 20, are combined and taken to shorted SCR detector enable circuit 412. Enable circuit 412 is disabled by a start signal and by a signal indicating a missing phase from phase angle circuit 36. The output of an enable circuit 412 is taken to zero crossing discriminator 414, the output of which is taken to pulse stretcher 416. A stretched pulse from pulse stretcher 416 is taken to error pulse accumulator 418 which is connected to shorted switch detector 420. The output of shorted switch detector 420 provides an indication usable for providing a visual indication of a shorted semiconductor switch and for tripping breakers in the circuit.

Figures 1, 5B:
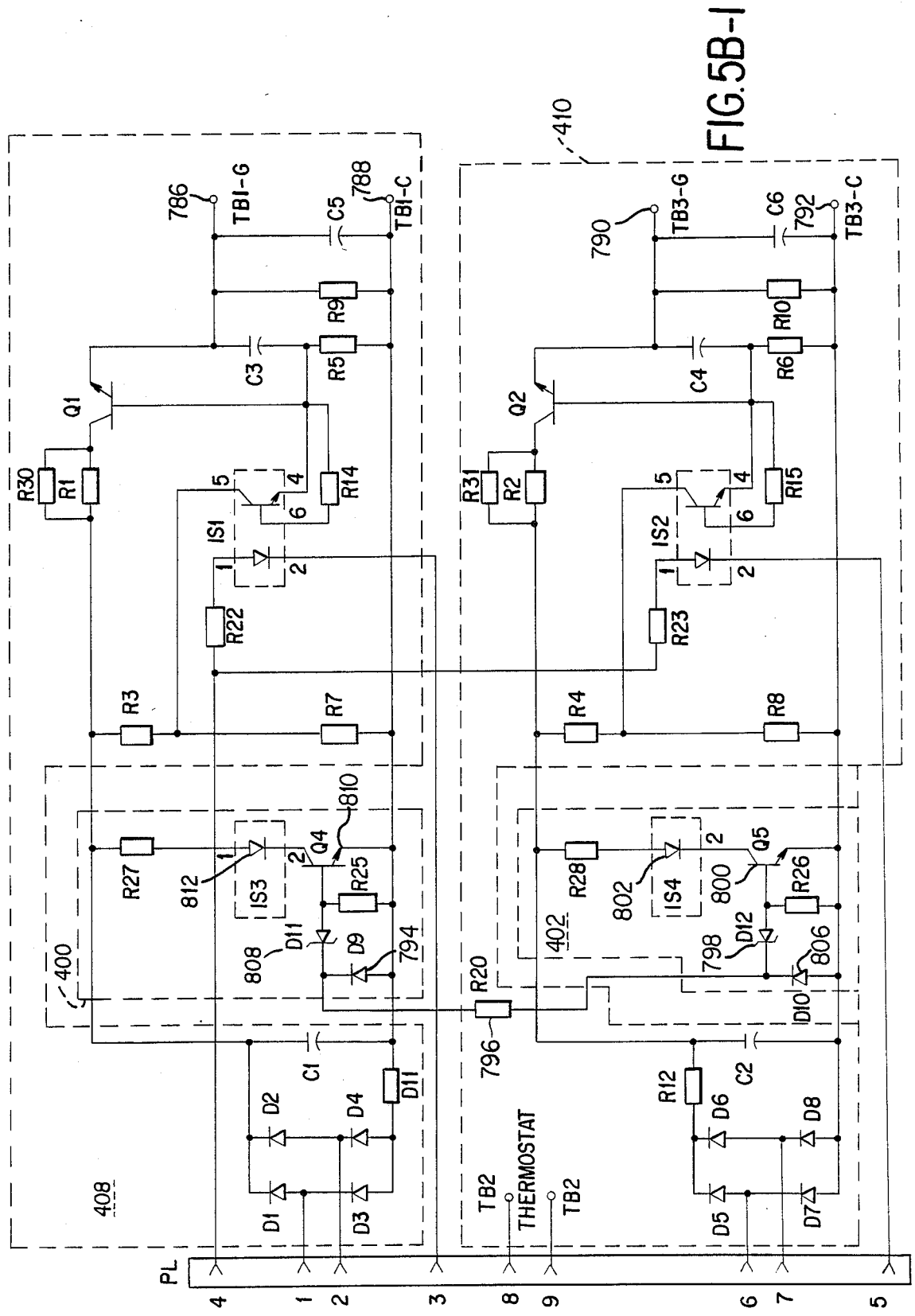
FIG. 5B is a circuit schematic of preferred circuitry for implementation of the functional blocks of FIG. 5A.
Figure 5B:
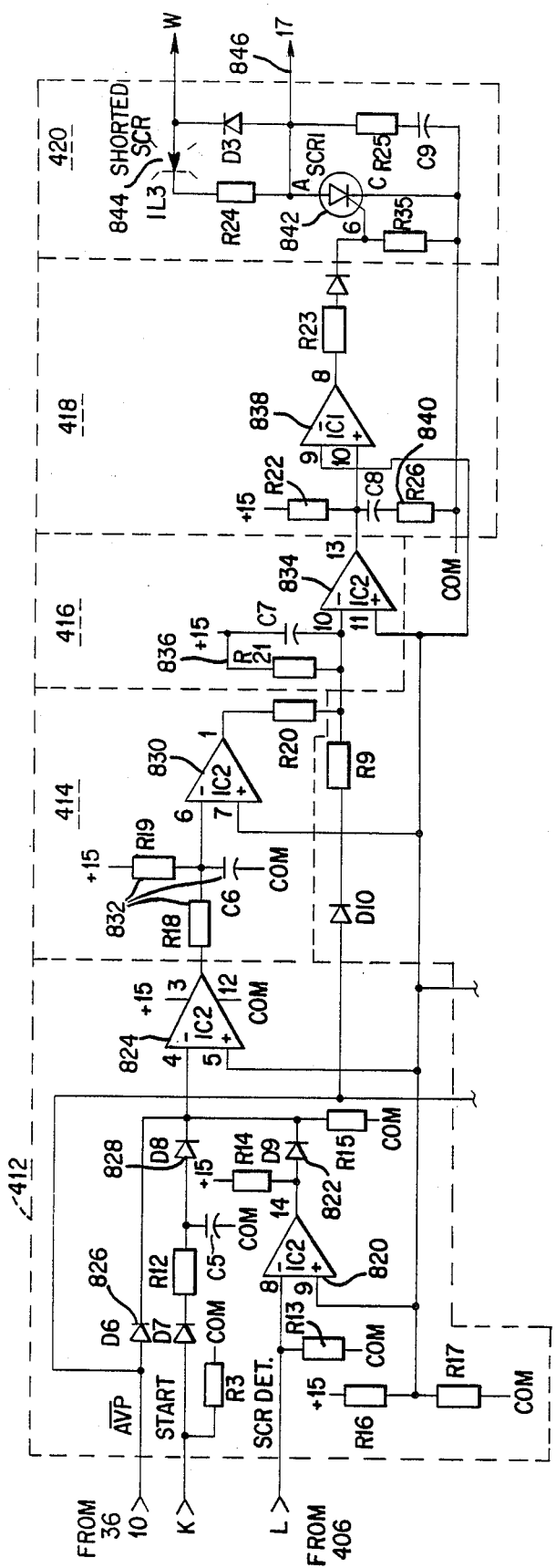

Referring to FIG. 5B, power amplifier circuit 408 is one of three identical circuits which are associated between the cathode and gate of ones of the SCR's 16 18 and 20. Reverse power amplifier circuit 410 is one of three identical circuits which are connected from the cathode to the gate of reverse connected ones of the SCR's of switching circuits 16, 18 and 20. Thus power amplifier circuits 408 and 410 are both connected to portions of the circuits of SCR's 16 and two corresponding circuits exist for SCR's 18 and 20 of FIG. 1.

In power amplifier circuit 408, terminal 786 is connected to the gate of a forward conducting SCR at SCR switching circuit 16, and terminal 788 is connected to the cathode of the same semiconducting switch. Similarly, in power amplifier circuit 410, terminal 790 is connected to the gate of the reverse connected SCR of semiconductor switching circuit 16, and terminal 792 is connected to the cathode of the reversed semiconductor SCR of switching circuit 16. The voltage between terminal 788 and terminal 792 is the voltage across semiconductor switch 16 of FIG. 1. When terminal 788 is positive with respect to terminal 792, a path for current between these terminals exists through diode 794, resistor 796, zener diode 798 and transistor 800, which will be caused to conduct. This turns on LED 802, which is part of an optical coupler causing conduction of transistor 804 of shorted switch center 404. Diode 794 is part of forward semiconductor switch circuit 400. Resistor 796 is part of reversed power amplifier circuit 410. Zener diodes 798, transistor 800 and LED 802 are part of reverse semiconducting switch circuit 402.

When terminal 792 is positive with respect to terminal 788, a conducting path is created through diode 806 of reverse switch circuit 402. The conduction path continues through resistor 796 and through zener diode 808 and transistor 810 of forward semiconductor switch 400. When transistor 810 conducts this causes LED 812 to light turning on transistor 814 in shorted switch sensor 404. The combination of LED 802 and transistor 804 is a packaged optical coupler used for isolation as is the combination of LED 812 and transistor 814. Conduction of either transistor 804 or 814 generates a signal that is taken to output buffer 406 where it causes conduction of transistor 816.

The signal on the collector of transistor 816 is taken through logical diode 818 where it is combined logically with signals from the corresponding output buffers 406 associated with the other two SCR's 18 and 20 of FIG. 1. The three signals are taken to shorted SCR detector 412 where they are applied as one input to operational amplifier 820, which is connected as an invertor. The output of operational amplifier 820 is coupled through a logical diode 822 to an input terminal of operational amplifier 824 where it is combined logically with a signal from phase angle circuit 36 and a start signal. The effect of logical diodes 826 and 828 on these signals combines with the effect of diode 822 to produce an input to operational amplifier 824 only when none of the three signals is present. Thus an output from operational amplifier 824 indicates that there is a shorted SCR, that the motor is off, and that all three phase voltages are present.

This signal is coupled to zero crossing discriminator 414 where it is applied to a comparator 830. Comparator 830 is connected through a network 832 that prevents the signals resulting from normal zero crossings from triggering comparator 30, but which permits comparator 30 to generate an output when a shorted SCR is detected. The output of comparator 830 is taken to pulse stretcher 416. Pulse stretcher 416 includes an operational amplifier 834 with an input network 836 and comprises a signal shot. The output of operational amplifier 834 is thus high in the event of either a totally shorted SCR or in case an SCR is shorting once per cycle for only a portion of the cycle. Either of these cases produces output that is taken to error pulse accumulator 418 where it is applied to operational amplifier 838 across a time delay network 840.

Time delay network 840 delays action in the case of a random false indication. An output from operational amplifier 838 indicating a shorted SCR is taken to shorted switch detector 420 where it is applied to trigger SCR 842. Current through SCR 842 lights LED 844 to produce a panel indication of a shorted SCR. It is also coupled to terminal 846 for use in terminating power to the motor in case of a shorted SCR.

While a detailed description of the preferred embodiment of practicing the present invention has been provided, the scope of the invention is not limited to these details but rather is defined in the appended claims.

I claim:

1. In a reduced voltage starter having a semiconductor switch circuit for controlling the application of power to a motor from a three phase power source, each phase of said three phase source having a phase adjacent thereto which, in turn, is adjacent to a remaining phase, a line-to-line to line-to-neutral converter, comprising:

a first transformer, a second transformer, and a third transformer, each transformer having a primary winding and a secondary winding, and said primary winding of each transformer respectively connected between said adjacent phases of said three phase power source in a delta configuration, and one end of each said secondary winding of each transformer respectively connected together at a tie point to form a Y connection;

a first end of a first resistor (R1) (reference numerals refer to FIG. 3C) connected to a free end of a first said secondary winding, and a second end of said first resistor connected to a first end of a second resistor (R7), a first end of a third resistor (R4), and an output lead of said voltage proportional to said first phase relative to neutral, a second end of said second resistor (R7) connected to said tie point, and a second end of said third resistor (R4) connected to a free end of a second said secondary winding:

said free end of said second said secondary winding additionally connected to a first end of a fourth resistor (R2), and a second end of said fourth resistor (R2) connected to a first end of a fifth resistor (R8), a first end of a sixth resistor (R5), and an output lead for said voltage proportional to said second phase relative to neutral, a second end of said fifth resistor (R8) connected to said tie point, and a second end of said sixth resistor (R5) connected to a free end of a third said secondary winding:

said free end of said third said secondary winding additionally connected to a first end of a seventh resistor (R3), and a second end of said seventh resistor (R3) connected to a first end of an eighth resistor (R9), a first end of a ninth resistor (R6), and an output lead for said voltage proportional to said third phase relative to neutral, a second end of said eighth resistor (R9) connected to said tie point, and a second end of said ninth resistor (R6) connected to said first end of said first resistor (R1) and said free end of said first said secondary winding.

2. The apparatus as in claim 30 wherein said first resistor (R1), said fourth resistor (R2), and said seventh resistor (R3) have substantially the same resistance of a predetermined value: and, wherein said third resistor (R4), said sixth resistor (R5), and said ninth resistor (R6) have substantially the same resistance of substantially twice said predetermined value.

* * * * *